United States Patent
Jia et al.

(10) Patent No.: US 9,037,857 B2
(45) Date of Patent: May 19, 2015

(54) SYSTEM AND METHOD FOR DOWNLOADING APPLICATION

(75) Inventors: Qian Jia, Shenzhen (CN); Jingwang Ma, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 186 days.

(21) Appl. No.: 13/202,231

(22) PCT Filed: Dec. 11, 2009

(86) PCT No.: PCT/CN2009/075506
§ 371 (c)(1),
(2), (4) Date: Aug. 18, 2011

(87) PCT Pub. No.: WO2010/096994
PCT Pub. Date: Sep. 2, 2010

(65) Prior Publication Data
US 2011/0296182 A1 Dec. 1, 2011

(30) Foreign Application Priority Data

Feb. 27, 2009 (CN) .......................... 2009 1 0118679

(51) Int. Cl.
*H04L 9/32* (2006.01)
*H04L 29/08* (2006.01)
(Continued)

(52) U.S. Cl.
CPC ................ *H04L 67/34* (2013.01); *G06Q 20/32* (2013.01); *G06Q 20/3229* (2013.01);
(Continued)

(58) Field of Classification Search
USPC .......................................... 713/168; 709/217
See application file for complete search history.

(56) References Cited

U.S. PATENT DOCUMENTS

2002/0040936 A1* 4/2002 Wentker et al. ................ 235/492
2004/0123138 A1 6/2004 Le Saint
(Continued)

FOREIGN PATENT DOCUMENTS

CN 1788250 A 6/2006
CN 1819513 A 8/2006
(Continued)

OTHER PUBLICATIONS

Madlmayr, Gerald, et al. "The benefit of using SIM application toolkit in the context of near field communication applications." Management of Mobile Business, 2007. ICMB 2007. International Conference on the. IEEE, 2007.*

(Continued)

*Primary Examiner* — Vikkram Bali
*Assistant Examiner* — Tracy Mangialaschi
(74) *Attorney, Agent, or Firm* — Oppedahl Patent Law Firm LLC

(57) ABSTRACT

A method for downloading an application is disclosed by the present invention which is implemented based on an application downloading system including a smart card, a mobile terminal, an Over The Air (OTA) server and an outside-card entity management platform. The outside-card entity management platform establishes a connection with the smart card through the OTA server and mobile terminal, selects a security domain for application downloading in the smart card after receiving an application downloading request from the smart card, establishes a security channel with the smart card, and downloads the application to the smart card based on the security channel. By using the system and method for downloading an application of the present invention, the application may be downloaded to the smart card over a mobile communication network at a high speed, in real time, conveniently and safely, with user experience being improved.

37 Claims, 6 Drawing Sheets

(51) Int. Cl.
*G06Q 20/32* (2012.01)
*G06Q 20/34* (2012.01)
*G07F 7/10* (2006.01)
*H04M 15/00* (2006.01)
*H04W 4/00* (2009.01)
*H04L 29/06* (2006.01)
*H04W 12/04* (2009.01)
*H04W 12/06* (2009.01)

(52) U.S. Cl.
CPC ....... *G06Q 20/3552* (2013.01); *G06Q 20/3563* (2013.01); *G07F 7/1008* (2013.01); *H04M 15/00* (2013.01); *H04M 15/68* (2013.01); *H04W 4/001* (2013.01); *H04W 4/003* (2013.01); *H04L 63/04* (2013.01); *H04L 63/0853* (2013.01); *H04W 12/04* (2013.01); *H04W 12/06* (2013.01)

(56) References Cited

U.S. PATENT DOCUMENTS

| | | |
|---|---|---|
| 2004/0123152 A1 | 6/2004 | Le Saint |
| 2006/0196931 A1 | 9/2006 | Holtmanns et al. |
| 2008/0022381 A1 | 1/2008 | Le Saint |
| 2009/0235352 A1* | 9/2009 | Schrijen et al. ................ 726/18 |

FOREIGN PATENT DOCUMENTS

| | | |
|---|---|---|
| CN | 101164086 A | 4/2008 |
| CN | 101340663 A | 1/2009 |
| CN | 101374153 A | 2/2009 |
| EP | 1431862 A2 | 6/2004 |
| JP | 2000172808 A | 6/2000 |
| JP | 2002312724 A | 10/2002 |
| JP | 2003316461 A | 11/2003 |
| JP | 2005535195 A | 11/2005 |
| JP | 200679223 A | 3/2006 |
| JP | 2008537370 A | 9/2008 |
| JP | 2012512474 A | 5/2012 |
| WO | 2005076204 A1 | 8/2005 |

OTHER PUBLICATIONS

GlobalPlatform Card Specification Version 2.2, Mar. 2006.*
Giesecke & Devrient, White Paper: Bearer Independent Protocol (BIP), 2006.*
International Search Report in international application No. PCT/CN2009/075506, mailed on Mar. 25, 2010.
English Translation of the Written Opinion of the International Search Authority in international application No. PCT/CN2009/075506, mailed on Mar. 25, 2010.
Supplementary European Search Report in European application No. 09840662.2, mailed on May 2, 2014.

* cited by examiner

US 9,037,857 B2

SYSTEM AND METHOD FOR DOWNLOADING APPLICATION

TECHNICAL FIELD

The present invention relates to the field of communications, and particularly to a system and a method for downloading an application, which are applied to electronic payment at a mobile terminal.

BACKGROUND

A Near Field Communication (NFC) technology, which is a short range wireless communication technology operating at 13.56 MHz, is merged by and evolved from a Radio Frequency Identification (RFID) technology and an interconnection technology. Mobile phones and other mobile terminals can simulate non-contact Integrated Circuit (IC) cards after integrated with the NFC technology, so as to be used for electronic payment-related applications. If mobile terminals are applied to the field of electronic payment, the serviceable range of the mobile terminals can be further enlarged, and convenience can be brought to people's life, therefore the mobile terminals have a wide application prospect.

In relevant technologies, an electronic payment application is placed in a smart card, and is usually pre-set in a smart card by a card issuer when the smart card leaves a factory. A plurality of electronic payment applications can be installed in a smart card. In order to make electronic payment applications safe, smart cards adopt Global Platform Card Specification V2.1/V2.2, where a smart card is divided into a plurality of independent security domains, so as to ensure the isolation and independency among a plurality of electronic payment applications.

A main security domain, also called an Issuer Security Domain (ISD), is a main and compulsory on-card representation of a card issuer, and contains a security domain key used for supporting security channel protocol operation and card content management.

An Supplementary Security Domain (SSD), which is an additional and optional on-card representation of an application provider, a card issuer, or an agency thereof, stores electronic payment applications autonomously managed by the application provider and those entrusted by an application provider to a card issuer for management; a control party of the security domain can operate and maintain the stored electronic payment applications, for example, downloading a new electronic payment application, upgrading and deleting an electronic payment application.

In the prior art, there is no specific scheme for downloading an electronic payment application. Therefore, there is an urgent need to provide a technical scheme for downloading an application conveniently and quickly.

SUMMARY

In view of the above, a main objective of the present invention is to provide a system and a method for downloading an application, so as to download the application conveniently and quickly.

In order to solve the above technical problem, the present invention provides a method for downloading an application, comprising: establishing a connection with a smart card by an outside-card entity management platform through an Over The Air (OTA) server and a mobile terminal;

selecting a security domain responsible for application downloading from the smart card after receiving an application downloading request from the smart card, and establishing a security channel with the smart card by the outside-card entity management platform;

and downloading the application to the smart card based on the security channel by the outside-card entity management platform.

The outside-card entity management platform may be a card issuer management platform or an application provider management platform.

When the application is an application entrusted by an application provider to a card issuer for management, the outside-card entity management platform may comprise the card issuer management platform and the application provider management platform, and the method may specifically comprise:

the card issuer management platform establishes a connection with the smart card through the OTA server and the mobile terminal and receives an application downloading request sent by the smart card; and the application provider management platform selects a supplementary security domain responsible for application downloading from the smart card, establishes a security channel with the smart card through the card issuer management platform, the OTA server, and the mobile terminal, and downloads the application to the smart card based on the security channel.

Before receiving the application downloading request from the smart card, the method may further comprise:

selecting an application to download by a user through an SIM Tool Kit (STK) menu of the smart card;

or, selecting an application to download by a user through browsing web pages based on a Smart Card Web Server (SCWS), and initiating a connection between the smart card and the mobile terminal, the OTA server and the outside-card entity management platform; and after the connection is established, initiating an application downloading request by the smart card.

The establishing a security channel between the outside-card entity management platform and the smart card may specifically comprise: the outside-card entity management platform performs identity authentication with the smart card according to a preset security channel protocol, and establishes a security channel; and the preset security channel protocol is based on a symmetric key or asymmetric key mechanism.

The card issuer management platform or the application provider management platform establishing a connection with the smart card through the OTA server and the mobile terminal may specifically comprise:

the card issuer management platform or the application provider management platform establishes a connection with the OTA server according to a preset connection method or a preset protocol;

the OTA server establishes a connection with the smart card in the mobile terminal through a mobile data service channel or a short message channel.

Interactive commands or responses between the card issuer management platform or the application provider management platform and the smart card are attached as a data volume to mobile data service channel data or to data information of a short message.

In the application downloading process, the card issuer management platform or the application provider management platform sends a preset command to the smart card in a manner as follows:

the card issuer management platform or the application provider management platform encapsulates the preset command as data and sends it to the smart card in the mobile terminal through the OTA server; the smart card uses a Bearer Independent Protocol (BIP) command to receive the encapsulated preset command, parses the preset command and executes a corresponding operation according to the preset command;

or, the card issuer management platform or the application provider management platform sends the preset command to the smart card through a downlink short message of the OTA server, and the smart card receives the preset command from the downlink short message and executes a corresponding operation according to the preset command.

After the corresponding operation is executed according to the preset command, the method may further comprise: sending a response to the preset command by the smart card to the card issuer management platform or the application provider management platform in a manner as follows:

after executing the corresponding operation, the smart card encapsulates a command in response to the preset command according to a data format of the BIP command and sends the encapsulated response command to the mobile terminal; and the mobile terminal sends the response to the preset command to the card issuer management platform or the application provider management platform through the OTA server;

or, after executing the corresponding operation, the smart card sends the response to the preset command to the mobile terminal in the form of an uplink short message, and the mobile terminal sends the response to the preset command to the card issuer management platform or the application provider management platform through the OTA server.

When the preset command is an application downloading command, the smart card executes application downloading after receiving the preset command.

When the application is an application entrusted by an application provider to a card issuer for management, the method may further comprise:

sending a token application to the card issuer management platform and receiving a token key from the card issuer management platform by the application provider management platform;

the application provider management platform sending the preset command to the smart card may specifically comprise: the application provider management platform generates a preset command containing a load token and sends the preset command to the smart card in the mobile terminal through the OTA server.

The establishing a connection with the smart card through the OTA server and the mobile terminal may specifically comprise: the smart card establishes a BIP connection with the mobile terminal, and a connection is established between the mobile terminal and the OTA server through a preset protocol; and the mobile terminal transparently transmits data between the smart card and the OTA server, and interactive commands or responses between the card issuer management platform or the application provider management platform and the smart card are attached as a data volume to channel data of an active command supported by the BIP.

The interactive commands or responses between the card issuer management platform or the application provider management platform and the smart card are attached as a data volume to channel data of an active command supported by the BIP, specifically comprising:

the card issuer management platform or the application provider management platform encapsulates the commands as data according to a preset data format and sends them to the mobile terminal through the OTA server; and after receiving a Data Available event from the mobile terminal, the smart card uses a Receive Data command to receive the data, parsing the data to obtain the commands, and performs corresponding operations according to the commands; and after the operations are accomplished, the smart card encapsulates responses to the commands in the form of channel data of a Send Data command, and sends them to the mobile terminal and then to the card issuer management platform or the application provider management platform through the OTA server.

The selecting a security domain responsible for application downloading from the smart card may specifically comprise:

when the application is an application self-owned by a card issuer, the card issuer management platform selects an issuer security domain in the smart card, or, the card issuer management platform creates a supplementary security domain for the application and selects the supplementary security domain;

when the application is an application autonomously controlled by an application provider or an application entrusted by an application provider to a card issuer for management, if no supplementary security domain is created for the application, the card issuer management platform selects an issuer security domain, establishes a security channel with the smart card, creates a supplementary security domain, generates a supplementary security domain initial key, and sends the supplementary security domain initial key to the application provider management platform; the application provider management platform selects a supplementary security domain responsible for application downloading, and updates a supplementary security domain key based on the security channel; and if a supplementary security domain has been created for the application, the application provider management platform selects a supplementary security domain responsible for application downloading and updates a supplementary security domain key based on the security channel.

The present invention further provides a system for downloading an application, comprising a smart card, a mobile terminal, an OTA server and an outside-card entity management platform, wherein the outside-card entity management platform is for establishing a connection with the smart card through the OTA server and the mobile terminal, receiving an application downloading request from the smart card, selecting a security domain responsible for application downloading from the smart card, and downloading the application to the smart card based on a security channel after the security channel is established with the smart card;

the OTA server is for establishing a security connection with the outside-card entity management platform, connecting with the mobile terminal, and providing downloading service for the smart card in the mobile terminal; and the smart card, which is located in the mobile terminal, is for establishing a security channel with the outside-card entity management platform through the mobile terminal and the OTA server, and performing an application downloading operation over the security channel.

The outside-card entity management platform may be a card issuer management platform or an application provider management platform.

The outside-card entity management platform may be an application provider management platform, and the system may further comprise a card issuer management platform, wherein the application provider management platform comprises:

an applying module for sending a supplementary security domain creating request to the card issuer management platform if no supplementary security domain is created for the application;

a receiving module for receiving a supplementary security domain initial key from the card issuer management platform;

an updating module for updating a supplementary security domain key over the security channel; and the card issuer management platform comprises a creating and sending module for receiving a supplementary security domain creating request from the application provider management platform, creating a supplementary security domain, and generating and sending a supplementary security domain initial key to the application provider management platform.

The outside-card entity management platform may comprises a card issuer management platform and an application provider management platform, wherein the card issuer management platform is for establishing a connection with the smart card through the OTA server and the mobile terminal, and receiving an application downloading request from the smart card; and the application provider management platform is for selecting a security domain responsible for application downloading from the smart card, and downloading the application to the smart card based on a security channel after the security channel is established with the smart card.

the card issuer management platform may comprise a creating and sending module for creating a supplementary security domain if no supplementary security domain is created for the application, generating a supplementary security domain initial key, and sending the supplementary security domain initial key to the application provider management platform;

the application provider management platform may comprise:

a receiving module for receiving a supplementary security domain initial key; and an updating module for updating a supplementary security domain key over the security channel.

The smart card may further comprise an STK menu module for providing an application downloading menu for users for selecting an application for downloading;

or, the system may further comprise a smart card network server for providing an application downloading option web page for users for selecting an application for downloading.

The application provider management platform or the card issuer management platform may further comprise an authenticating and establishing module for performing identity authentication with the smart card according to a preset security channel protocol, and establishing a security channel, wherein the preset security channel protocol is based on a symmetric key or asymmetric key mechanism.

The card issuer management platform or the application provider management platform may establish a connection with the OTA server according to a preset connection method or a preset protocol; and the OTA server may establish a connection with the smart card in the mobile terminal through a mobile data service channel or a short message channel.

The card issuer management platform or the application provider management platform may further comprise:

an encapsulation module for generating a preset command, and attaching the preset command as a data volume to mobile service data channel data, or attaching the preset command to a downlink short message of the OTA server; and a sending module for sending the encapsulated preset command to the smart card through the OTA server and the mobile terminal;

the smart card may further comprise:

a receiving and parsing module for receiving the encapsulated preset command by using a BIP command, parsing the encapsulated preset command to obtain the preset command, or receiving the preset command from the downlink short message;

an executing module for executing a corresponding operation according to the preset command; and a responding module for encapsulating a command in response to the preset command according to a data format of the BIP command after the executing module executes the corresponding operation according to the preset command, sending the encapsulated response to the mobile terminal; or sending, in the form of an uplink short message, the response to the preset command to the mobile terminal which then sends the response to the preset command to the card issuer management platform or the application provider management platform through the OTA server.

The application provider management platform may further comprise a token applying module for sending a token application to the card issuer management platform and receiving a token key from the card issuer management platform;

the card issuer management platform may further comprise a token sending module for sending a token key to the application provider management platform after receiving a token application from the application provider management platform; and the encapsulation module for generating a preset command containing a load token.

The smart card and the mobile terminal may be specifically for establishing a BIP connection; the mobile terminal and the OTA server may be specifically used for establishing a connection through a preset protocol; and the mobile terminal may be for transparently transmitting data between the smart card and the OTA server.

The card issuer management platform or the application provider management platform may further comprise:

an encapsulation module for encapsulating a command as data according to a preset data format and attaching a preset command as a data volume to mobile service data channel data; and a sending module for sending an encapsulated preset command to the mobile terminal through the OTA server;

the smart card may further comprise:

a receiving and parsing module for using a Receive Data command to receive data after receiving a Data Available event from the mobile terminal, and parsing the data to obtain a preset command;

an executing module, for executing a corresponding operation according to a preset command; and a responding module for encapsulating a response to a preset command in the form of channel data of a Send Data command after the operation is accomplished and sending the encapsulated response to the mobile terminal and then to the card issuer management platform or the application provider management platform through the OTA server.

The present invention has the following advantageous effects: by adopting the system and method for downloading an application, an application can be downloaded to a smart card through a mobile communication network at a high speed, in real time, conveniently and safely, so that user experience can be improved.

DETAILED DESCRIPTION OF THE INVENTION

The present invention will be described in detail hereinafter in combination with the embodiments and with reference to the drawings. The drawings explained below are used for further understanding of the present invention and are part of the application; and the exemplary embodiments of the present invention and the explanations thereof are only used for explaining the present invention rather than limiting the invention inappropriately.

System Embodiment

Figure 1:
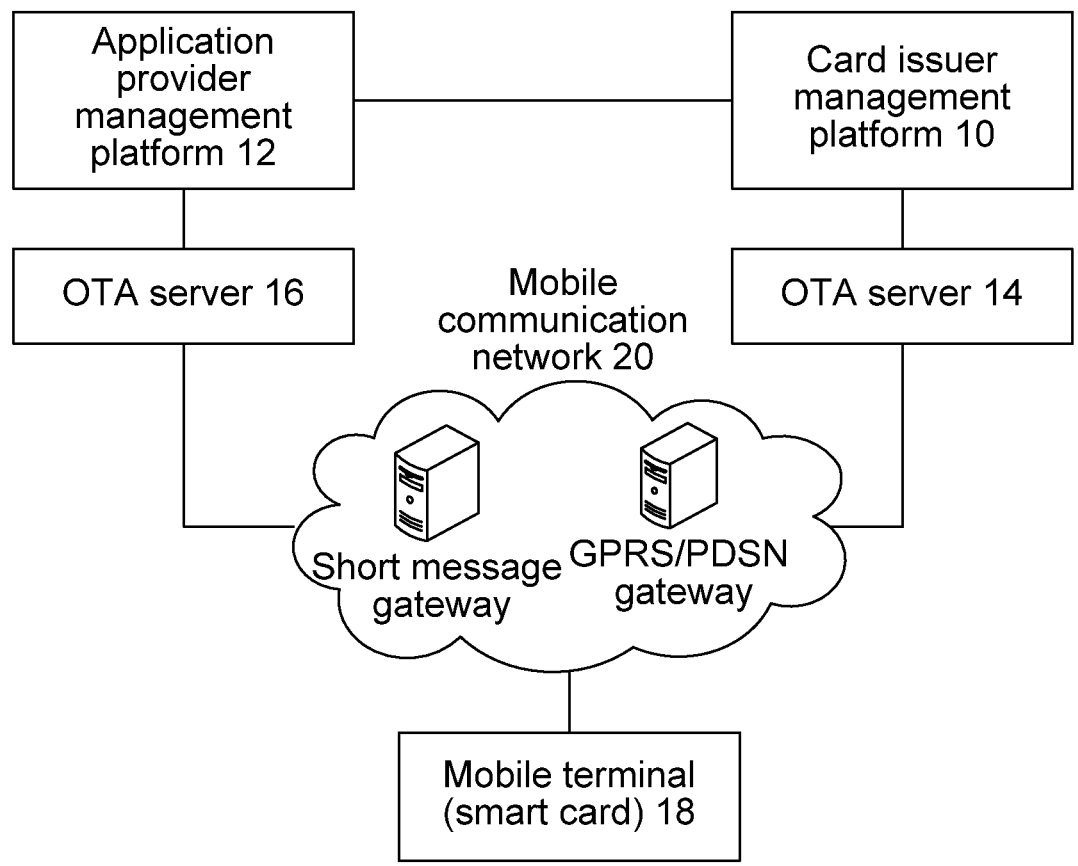
FIG. 1 shows a structural diagram of a system for downloading an application of the present invention.

According to embodiments of the invention, there is provided a system for downloading an application. FIG. 1 shows a structural diagram of a system for downloading an application according to the invention; as shown in FIG. 1, the system comprises a card issuer management platform 10, an application provider management platform 12, an Over The Air (OTA) server 14, an OTA server 16, a mobile terminal 18 including a smart card, and a mobile communication network 20. A plurality of application provider management platforms can be arranged in the system for downloading an application. The system for downloading an application will be explained in detail below.

The card issuer management platform 10 is manly for issuing and managing a smart card, and managing the resource, the life cycle, the key, the certification, the application and the like of the smart card. The card issuer management platform 10 is for establishing a connection with the smart card in the mobile terminal 18, selecting a security domain, and downloading the application to the smart card through a security channel after the security channel is established with the smart card; it may be further for creating a supplementary security domain and generating a supplementary security domain initial key; it may be still further for sending a token key, such as an issuer token key, to the application provider management platform 12 after receiving a token application from the application provider management platform 12.

The application provider management platform 12 is for establishing a connection with the smart card in the mobile terminal 18, sending a supplementary security domain creating request to the card issuer management platform 10, selecting a supplementary security domain after acquiring the supplementary security domain initial key from the card issuer management platform 10, updating the supplementary security domain key after establishing a security channel with the smart card in the mobile terminal 18, and downloading the application to the smart card over the security channel. Under the condition that the application is entrusted to the card issuer management platform 10 for management, the application provider management platform 12 is used for applying to the card issuer management platform 10 for a token for application downloading, generating a preset command containing a Load Token, establishing a security channel with the smart card in the mobile terminal 18 through the card issuer management platform 10 and the OTA server 14 thereof, and downloading the application to the smart card.

The card issuer management platform 10 and/or the application provider management platform 12 are called an outside-card entity management platform.

The OTA server 14 is for establishing a security connection with the card issuer management platform 10, connecting with the mobile terminal 18, and providing a downloading service for the smart card in the mobile terminal 18.

Figure 2:
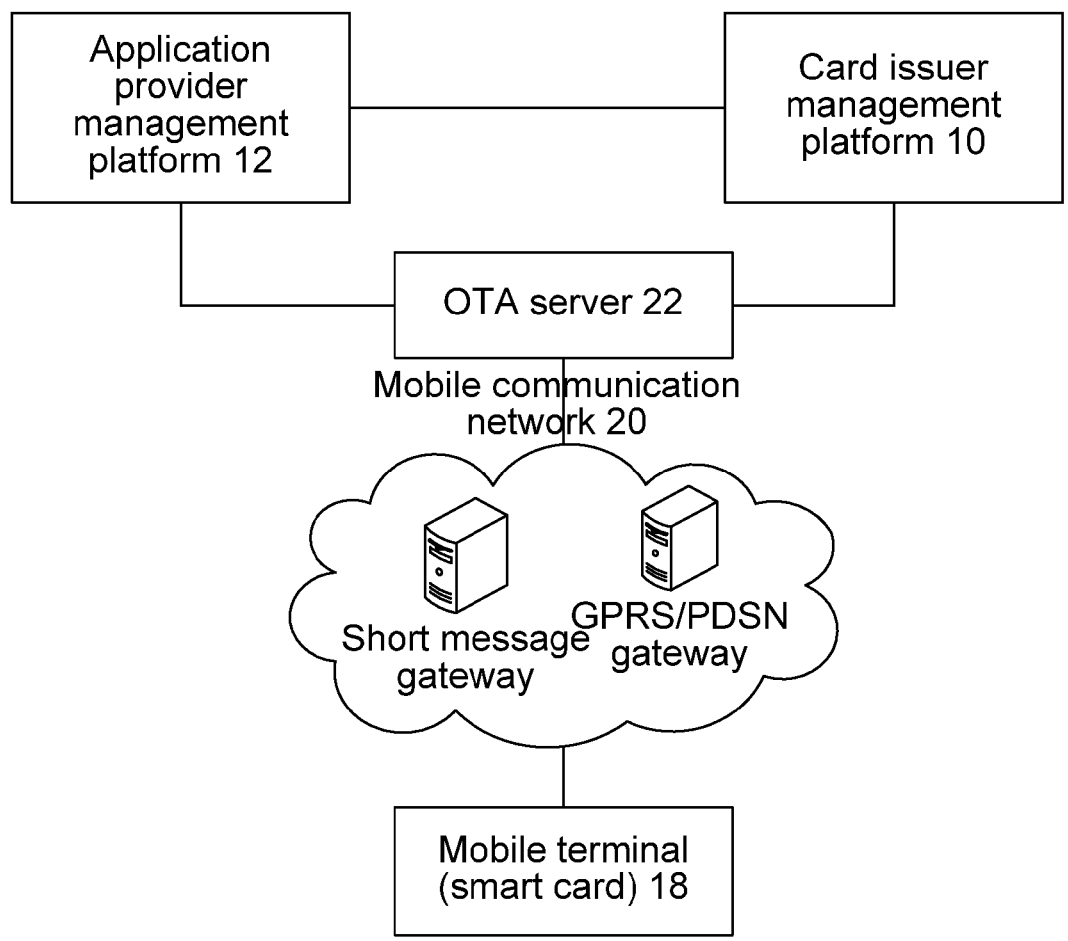
FIG. 2 shows another structural diagram of a system for downloading an application of the present invention.

The OTA server 16 is for establishing a security connection with the application provider management platform 12, connecting with the mobile terminal 18, and providing a downloading service for the smart card in the mobile terminal 18.

Wherein the OTA server 14 and the OTA server 16 can be merged into an OTA server 22; as shown in FIG. 2, the OTA server 22 is for establishing a security connection with the card issuer management platform 10 and/or the application provider management platform 12, connecting with the mobile terminal 18, and providing a downloading service for the smart card in the mobile terminal 18.

The mobile terminal 18 takes part in establishing a connection between the smart card and the OTA server 14/16 and is responsible for transparently transmitting data between the OTA server 14/16 and the smart card.

The smart card is arranged in the mobile terminal 18; if it is mounted on the mobile terminal, the smart card is for performing identity authentication with the OTA server 14/16, and further with the card issuer management platform 10 or the application provider management platform 12 through the mobile terminal 18, establishing a security channel, and completing an application downloading operation over the security channel.

In the present invention, a physical interface for data transmission between the mobile terminal and the smart card may be a traditional 7816 interface; and if the mobile terminal and the smart card both support a USB interface, in order to obtain a higher transmission rate, a USB interface may also be adopted. In the invention, the interaction between the mobile terminal and the smart card adds the support for a Bearer Independent Protocol (BIP) command, and a General Packet Radio Service (GPRS), a Universal Mobile Telecommunications System (UMTS) or other mobile high-speed data service channels with higher speed and safety can be adopted for data transmission. Moreover, in practical application, different protocols may be adopted between the mobile terminal 18 and the OTA server 14/16, and the use of the BIP is transparent to the OTA server 14/16.

The mobile communication network 20 is for providing an air data channel to ensure communication between the mobile terminal 18 and the OTA server 14/16.

Data transmission between the OTA server 14/16 and the mobile terminal 18 containing the smart card may be based on two manners, one being that the data transmission is implemented based on the BIP and through the GPRS gateway, UMTS or other 3G gateways of the mobile communication network 20 (namely, through a mobile data service channel), which can ensure high-speed data transmission as well as reliability and integrity of data transmission, and the other manner being that the data communication between the OTA server 14/16 and the smart card implements application downloading in a manner of a short message through a short message gateway of the mobile communication network 20, and in the case that the mobile terminal does not support a mobile data service or the mobile terminal or the smart card does not support the BIP, application downloading can be implemented using a short message channel.

The card issuer management platform further comprises:

a creating and sending module for receiving a supplementary security domain creating request from the application provider management platform, or creating a supplementary security domain if no supplementary security domain has been created for the application, generating a supplementary security domain initial key and sending it to the application provider management platform.

The application provider management platform further comprises:

an applying module for sending a supplementary security domain creating request to the card issuer management platform if no supplementary security domain has been created for the application;

a receiving module for receiving a supplementary security domain initial key from the card issuer management platform; and an updating module for updating a supplementary security domain key over the security channel;

the smart card further comprises an SIM tool kit (STK) menu module for providing an application downloading menu for users for selecting an application for downloading; or, the application downloading system further comprises a Smart Card Web Server (SCWS) for providing a web page of application downloading options for users for selecting an application for downloading.

The application provider management platform or the card issuer management platform further comprises an authenticating and establishing module for performing identity authentication with the smart card according to a preset security channel protocol, and establishing a security channel, wherein the preset security channel protocol is based on a symmetric key or asymmetric key mechanism.

The card issuer management platform or the application provider management platform further comprises:

an encapsulation module for generating a preset command, and attaching the preset command as a data volume to mobile service data channel data, or attaching the preset command to a downlink short message of the OTA server; and a sending module for sending an encapsulated preset command to the smart card through the OTA server and the mobile terminal;

the smart card further comprises:

a receiving and parsing module for receiving the encapsulated preset command by using a BIP command, and parsing the received encapsulated preset command to obtain the preset command, or receiving the preset command from the downlink short message;

an executing module for executing a corresponding operation according to the preset command; and a responding module for encapsulating a command in response to the preset command according to the data format of the BIP command after the executing module executes the corresponding operation according to the preset command, and sending it to the mobile terminal; or sending, in the form of an uplink short message, the response to the present command to the mobile terminal which then sends the response to the preset command to the card issuer management platform or the application provider management platform through the OTA server.

The application provider management platform further comprises a token applying module for sending a token application to the card issuer management platform and receiving a token key from the card issuer management platform;

the card issuer management platform further comprises a token sending module used for sending a token key to the application provider management platform after receiving the token application from the application provider management platform;

the encapsulation module of the application provider management platform is for generating a preset command containing a load token key.

Preferably, a BIP connection is established between the smart card and the mobile terminal; a connection is established between the mobile terminal and the OTA server through a preset protocol; and the mobile terminal is for transparently transmitting data between the smart card and the OTA server. The card issuer management platform or the application provider management platform here comprises:

an encapsulation module used for encapsulating a preset command as data according to a preset data format and attaching the preset command as a data volume to mobile service data channel data; and a sending module used for sending an encapsulated preset command to the mobile terminal through the OTA server;

the smart card comprises:

a receiving and parsing module for using a Receive Data command to receive data after receiving a Data Available event from the mobile terminal, parsing the data and obtaining a preset command;

an executing module used for executing a corresponding operation according to a preset command; and a responding module used for encapsulating a response to the preset command in the form of channel data of a Send Data command after the executing module performs the operation, sending it to the mobile terminal, and then sending it to the card issuer management platform or the application provider management platform through the OTA server.

By using the above system for downloading an application, the application can be downloaded and installed conveniently through the mobile communication network.

Method Embodiment

Figure 3:
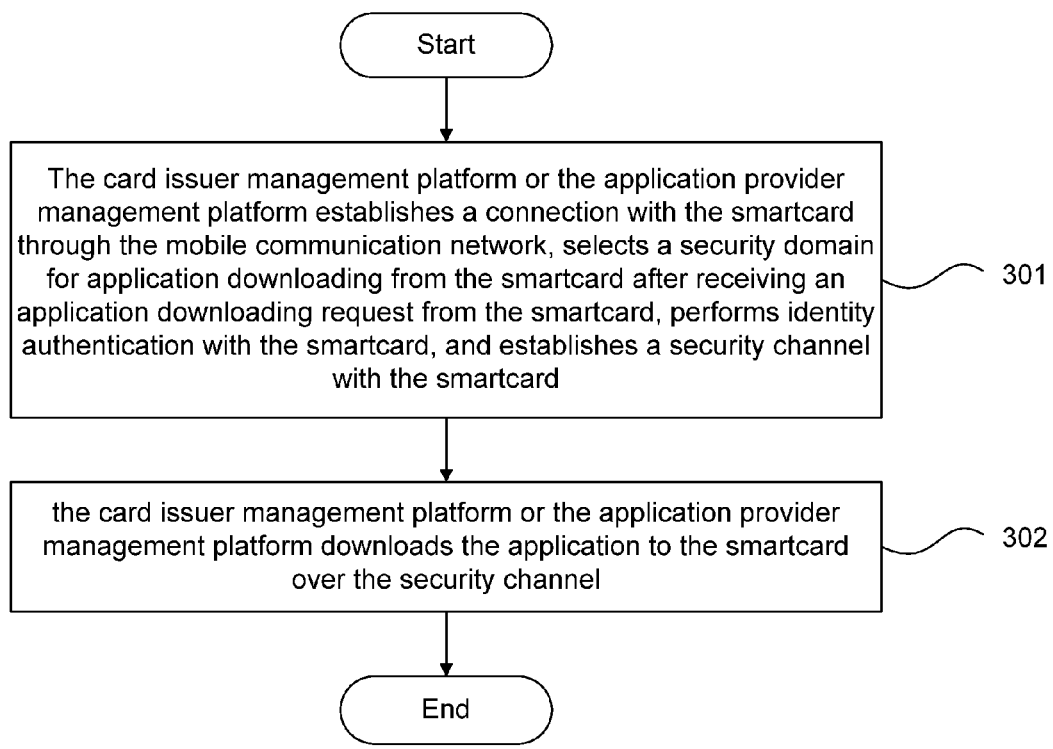
FIG. 3 shows a diagram of a flow of downloading an application of the present invention.

According to embodiments of the invention, a method for downloading an application is also provided for downloading the application to a smart card. FIG. 3 shows a diagram of a flow of downloading an application of the present invention. As shown in FIG. 3, the method comprises the following processing:

Step 301: a card issuer management platform or an application provider management platform establishes a connection with a smart card through a mobile communication network, selects a security domain responsible for application downloading from the smart card after receiving an application downloading request from the smart card, and establishes a security channel with the smart card.

In Step 301, the card issuer management platform or the application provider management platform establishing a connection with the smart card through the mobile communication network means that the card issuer management platform or the application provider management platform establishes a connection with the smart card and the mobile terminal through an OTA server, specifically comprising:

1. the card issuer management platform or the application provider management platform establishes a security connection with the OTA server through a preset connection method (a dedicated line or network) and a preset protocol; and 2. the smart card establishes a connection with the OTA server through a short message channel, GPRS/UMTS, or other data channels.

When a connection is established between the smart card and the OTA server through GPRS/UMTS or other data channels, preferably, a BIP connection is established between the smart card and the mobile terminal, and a connection is established between the mobile terminal and the OTA server through a certain preset protocol, such as a TCP/IP protocol; and the mobile terminal is responsible for transparently transmitting data between the smart card and the OTA server.

Under the condition that a connection is required to be established between the card issuer management platform and the application provider management platform, a security connection can be established through a preset connection method (a dedicated line or network) and a preset protocol that are agreed by the two parties.

The BIP is a connection-oriented transmission protocol proposed in the 3rd Generation Partnership Project (3GPP) standard, and can support high-speed data service channels including GPRS, Enhanced Data Rate for GSM Evolution (EDGE) technology, UMTS and the like, and support five active commands and two events, wherein the five active commands specifically are OPEN CHANNEL, CLOSE CHANNEL, RECEIVE DATA, SEND DATA and GET CHANNEL STATUS, and the two events specifically are Data available and Channel status, so that the smart card can establish a connection-oriented data channel with a remote OTA server by utilizing the carrying capacity of the mobile terminal.

Specifically, the smart card can instruct the mobile terminal to connect to the OTA server through a mobile data service channel by the OPEN CHANNEL command of the BIP; in the OPEN CHANNEL command, the smart card specifies BIP connection parameters including supported transmission protocol types (such as a transmission control protocol (TCP) and the like), size of a data buffer, the network address of the OTA server, a channel number and the like, so as to establish a connection between the smart card and the OTA server.

In Step 301, before the card issuer management platform or the application provider management platform establishes a connection with the smart card through the mobile communication network, the method further comprises: a user selects an application downloading menu item through an STK menu of the smart card, or, the user selects application downloading through browsing web pages based on an SCWS and initiates a connection between the smart card and the OTA server as well as the card issuer management platform or the application provider management platform.

In Step 301, the smart card initiates an application downloading request after establishing a connection with the card issuer management platform or the application provider management platform through the mobile communication network.

In Step 301, after the card issuer management platform or the application provider management platform receives the application downloading request, the method further comprises: the card issuer management platform or the application provider management platform determines whether the smart card is allowed to download, and if it is determined to be yes, the card issuer management platform or the application provider management platform selects a security domain for application downloading from the smart card through an established connection link. For the downloading of an application self-owned by a card issuer, the card issuer may select an issuer security domain or establish a supplementary security domain for corresponding application downloading, which is determined by the card issuer itself. For the downloading of an application of an application provider, no matter the application is entrusted to the card issuer or controlled autonomously by the application provider, if no supplementary security domain has been created for the application, then the card issuer management platform needs to select an issuer security domain first, establish a security channel with the smart card, create a supplementary security domain, generate a supplementary security domain initial key, and sends the key to the application provider management platform, and the application provider management platform selects a corresponding supplementary security domain, establishes a security channel with the smart card, and updates the supplementary security domain key; if a supplementary security domain has been created for the application, then the application provider management platform selects a corresponding supplementary security domain, performs identity authentication with the smart card, establishes a security channel, and updates the supplementary security domain key; and for the application entrusted to the card issuer, the corresponding supplementary security domain needs to have a Delegated Management Privilege.

In Step 301, the card issuer management platform or the application provider management platform establishing a security channel with the smart card is that the card issuer management platform or the application provider management platform performs identity authentication with the smart card according to a preset security channel protocol, and establishes a security channel. The preset security channel protocol may be based on a symmetric key or asymmetric key mechanism.

In Step 301, after a connection between the smart card and the card issuer management platform or the application provider management platform is established, the method further comprises: a series of commands and responses during the procedures of security domain selection, identity authentication, and security channel establishment are attached as a data volume to channel data of an active command supported by the BIP or to data information of uplink and downlink short messages, and transmitted between the smart card and the card issuer management platform or the application provider management platform.

Step 302: the card issuer management platform or the application provider management platform downloads the application to the smart card through the security channel.

In Step 302, preferably, the card issuer management platform or the application provider management platform downloading the application to the smart card may specifically comprise:

the card issuer management platform or the application provider management platform encapsulates a preset command as data according to a preset data format and sends it to the smart card through the OTA server;

the smart card receives the encapsulated preset command by using the BIP command, parses the data therein, and performs an application downloading operation according to the obtained command; the smart card encapsulates a command in response to the preset command according to the data format of the BIP command and sends it to the mobile terminal; and the mobile terminal sends the response command to the card issuer management platform or the application provider management platform through the OTA server and feeds back a downloading result.

In Step 302, preferably, the card issuer management platform or the application provider management platform downloading the application to the smart card may also comprise:

the card issuer management platform or the application provider management platform sends the preset command to the smart card through a downlink short message of the OTA server;

the smart card receives the preset command from the downlink short message and executes the application downloading operation according to the obtained preset command; the smart card sends the command in response to the preset command to the mobile terminal in the form of an uplink short message; and the mobile terminal sends the response command to the card issuer management platform or the application provider management platform through the OTA server and feeds back the downloading result.

In Step 302, the card issuer management platform or the application provider management platform sending a preset command (such as an application downloading command-INSTALL[for load]) to the smart card specifically comprises: for the downloading of an application self-owned by a card issuer, the preset command is generated by the card issuer management platform and sent to the smart card through the connection and the security channel above that are established through the mobile communication network; for the downloading of an application autonomously controlled by an application provider, the preset command is generated by the application provider management platform and sent to the smart card through the connection and the security channel above that are established through the mobile communication network; for the downloading of an application entrusted by an application provider to a card issuer for management, first, the application provider management platform is required to apply to the card issuer management platform for a token for application downloading, and then the card issuer management platform sends a token key such as an issuer token key to the application provider management platform after receiving the token application, and then the application provider management platform generates an application downloading command containing Load Token, and sends it to the smart card through the connection and the security channel above that are established through the mobile communication network.

Token, which is specifically related to an entrusted application, is generated by a card issuer, and is an evidence for authorization by the card issuer for managing card content. For the downloading of an application entrusted by an application provider to the card issuer for management, only when the application provider obtains the authorization from the card issuer, for example, obtains a token key provided by the card issuer, a new application can be downloaded to the smart card.

In Step 302, after the application is downloaded to the smart card, the card issuer management platform or the application provider management platform can send an application installation command (INSTALL[for install]) to the smart card based on the established security channel, so as to enable the application to be installed in the smart card. For a Java Card application, the application installation command will call an application program register( ) in the smart card to register a payment application example with JCRE (Java Card Runtime Environment), and allocate corresponding Application IDentifer (AID) of the application example to the payment application. After register( ) is executed successfully in the smart card, the application is installed successfully. Thereafter, the smart card sends a response message to the card issuer management platform or the application provider management platform and feeds back an installation result.

The commands and responses above in the application downloading procedure are attached as a data volume to channel data of an active command supported by BIP, specifically comprising: the card issuer management platform or the application provider management platform encapsulate the commands as data according to a preset data format and sends them to the mobile terminal through the OTA server; the smart card receives the data by using a BIP command-RECEIVE DATA after receiving a Data Available event from the mobile terminal, parses the data to obtain the commands, executes corresponding operations according to the command, encapsulates responses to the commands according to the form of channel data of a BIP command-SEND DATA, and sends them to the mobile terminal, and then to the card issuer management platform or the application provider management platform through the OTA server. Commands involved in the application downloading procedure include: the security domain selection command (SELECT), a series of commands for identity authentication and security channel establishment, and application downloading and installing commands (INSTALL).

Figure 4:
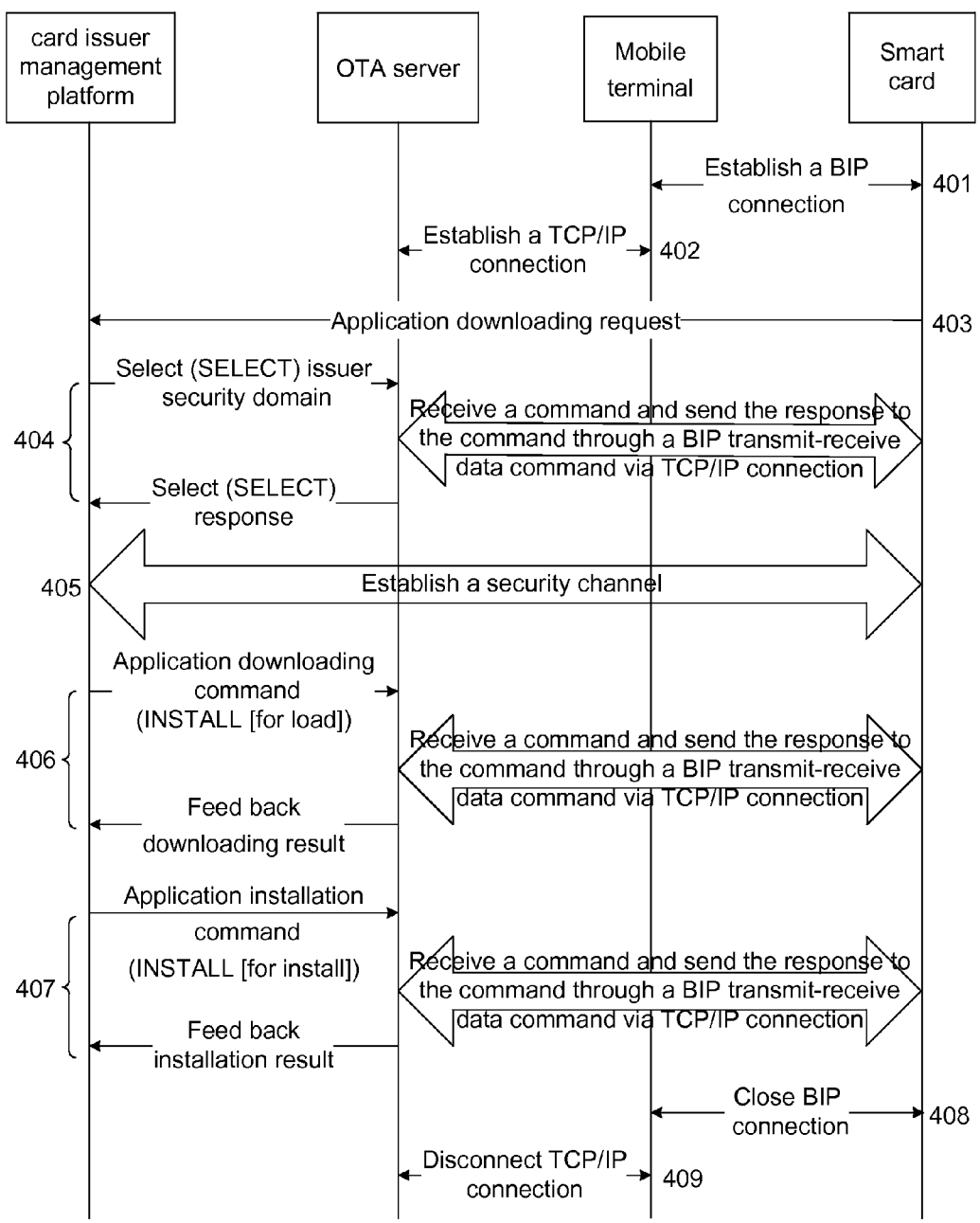
FIG. 4 shows a flow diagram of detailed signaling for downloading and installing an application self-owned by a card issuer according to a preferred embodiment of the present invention.

Next, the above technical solution of the present invention will be described in detail through specific examples. FIG. 4 shows a flow diagram of detailed signaling for downloading and installing an application self-owned by a card issuer according to a preferred embodiment of the present invention. As shown in FIG. 4, the method comprises the following processing:

Step 401: a user selects an application downloading menu item through an STK menu of the smart card, or, the user selects an application for downloading in the manner of web page browse based on the SCWS, and initiates a connection between the smart card and the OTA server as well as the card issuer management platform; and the smart card establishes a BIP connection through sending a BIP command-OPEN CHANNEL to the mobile terminal.

In the OPEN CHANNEL command, the smart card specifies BIP connection parameters including supported transmission protocol types (such as TCP and the like), size of a data buffer zone, the network address of the OTA server, a channel number and the like.

Step 402: the mobile terminal establishes the BIP connection with the smart card, and establishes a TCP/IP connection with the OTA server according to the network address of the OTA server and the transmission protocol types in the OPEN CHANNEL command.

Step 403: after the TCP/IP connection is established, the smart card initiates an application downloading request to the card issuer management platform.

Step 404: after receiving the application downloading request and determining that the smart card is allowed to download the application, the card issuer management platform selects an issuer security domain of the smart card, comprising:

a) the card issuer management platform defines the encapsulated SELECT command according to a command format in the Global Platform standard, fills the AID of the issuer security domain into the SELECT command, and sends the encapsulated SELECT command as data to the OTA server;

b) the mobile terminal receives data from the OTA server through the TCP/IP connection, notifies the smart card (through ENVELOPE Data available command) to fetch data using the 'Data available event', and sends a BIP command-Receive Data when the smart card drags data from the mobile terminal; and c) the smart card parses the data and selects an issuer security domain according to the SELECT command. After the command is executed, the smart card sends SELECT response data through the BIP command-SEND DATA; and the mobile terminal sends the data to the OTA server through the TCP/IP connection established above.

Step 405: after receiving the SELECT response, the card issuer management platform establishes a security channel with the smart card according to the provisions of Global Platform V2.2, wherein the method of transmitting the command used for establishing a security channel is the same as that of the SELECT command.

Step 406: after the security channel is established, the card issuer management platform sends the application downloading command INSTALL [for load] to the smart card, and according to the size of an application file, a plurality of INSTALL [for load] commands may be included; the smart card feeds back a downloading result to the card issuer management platform after accomplishing downloading; and the transmission method of the INSTALL [for load] command is the same as that of the SELECT command.

Step 407: the card issuer management platform sends the application installation command INSTALL [for install] to the smart card; the smart card feeds back the installation result to the card issuer management platform after accomplishing installation; and the transmission method of the INSTALL [for install] command is the same as that of the SELECT command.

Step 408: after accomplishing the application installation, the smart card may send a BIP command-CLOSE CHANNEL to close the BIP connection between the smart card and the mobile terminal; if there is a follow-up operation based on the mobile communication network, the BIP connection may not be closed and further download other applications.

And Step 409: the TCP/IP connection between the mobile terminal and the OTA server is disconnected.

Figure 5:
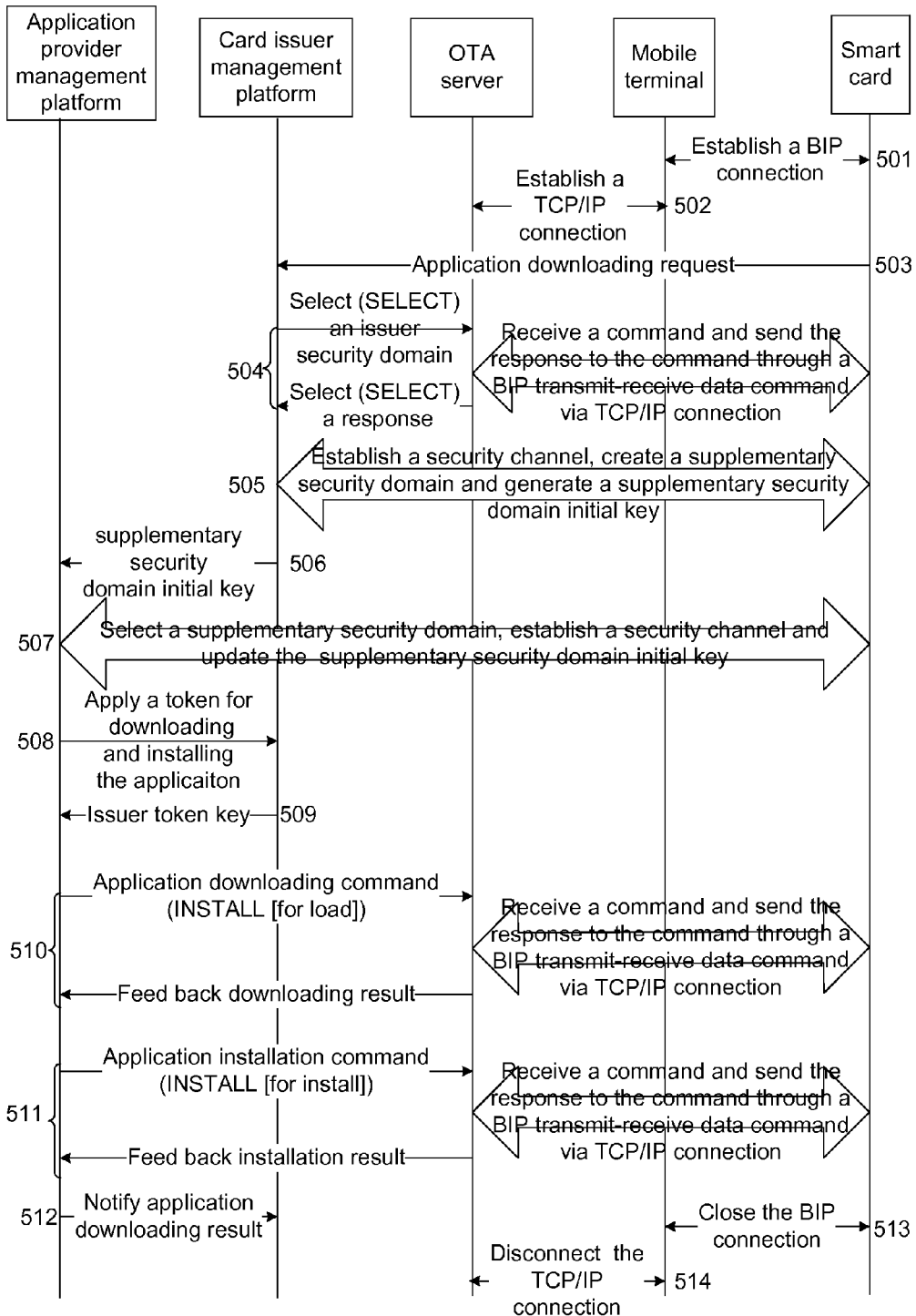
FIG. 5 shows a flow diagram of detailed signaling for downloading and installing an application entrusted by an application provider to a card issuer for management according to a preferred embodiment of the present invention.

FIG. 5 shows a flow diagram of detailed signaling for downloading and installing an application entrusted by an application provider to a card issuer for management according to a preferred embodiment of the present invention. As shown in FIG. 5, the flow comprises the following processing:

Step 501: a user selects an application downloading menu item through an STK menu of the smart card, or, the user selects an application for downloading in the manner of web page browse based on the SCWS, and initiates a connection between the smart card and the OTA server as well as the card issuer management platform; and the smart card establishes a BIP connection through sending a BIP command-OPEN CHANNEL to the mobile terminal; in the Open Channel command, the smart card specifies BIP connection parameters including supported transmission protocol types (such as TCP and the like), size of a data buffer zone, network address of the OTA server, a channel number and the like;

Step 502: the mobile terminal establishes the BIP connection with the smart card, and establishes a TCP/IP connection with the OTA server according to the network address of the OTA server and the transmission protocol types in the Open Channel command;

Step 503: after the TCP/IP connection is established, the smart card initiates an application downloading request to the card issuer management platform;

Step 504: after receiving the application downloading request, the card issuer management platform determines that the smart card is allowed to download the application and continues to determine whether a supplementary security domain is created for the application, if so, the card issuer management platform notifies the application provider management platform of the application that a user wants to download, and then Step 507 is executed, otherwise, an issuer security domain of the smart card is selected; the method of selecting a security domain is similar to the SELECT command and response processing in Step 404 in FIG. 4;

Step 505: after receiving the SELECT response, the card issuer management platform establishes a security channel with the smart card according to the provisions of Global Platform V2.2, and then creates a supplementary security domain and generates a supplementary security domain initial key; the transmission method of the command used in the process is similar to the SELECT command and response processing in Step 404 in FIG. 4;

Step 506: the card issuer management platform sends the supplementary security domain initial key to the application provider management platform;

Step 507: the application provider management platform selects a supplementary security domain of the smart card through the card issuer management platform as well as the OTA server and the mobile terminal thereof, establishes a security channel with the smart card, and updates the supplementary security domain key. The application provider management platform and the card issuer management platform communicate through a preset protocol; the method of communication between the card issuer management platform and the smart card is similar to the SELECT command and response processing in Step 404 in FIG. 4;

Step 508: the application provider management platform applies to the card issuer management platform for a Token for downloading and installing the application;

Step 509: the card issuer management platform sends an issuer Token key to the application provider management platform;

Step 510: the application provider management platform generates an application downloading command INSTALL [for load] containing a Load Token according to the issuer Token key and other information, and sends it to the smart card, and according to the size of an application file, a plurality of INSTALL [for load] commands may be included; the smart card feeds back the downloading result to the card issuer management platform after accomplishing downloading; and the transmission method of the INSTALL [for load] command and its response is similar to the SELECT command and response processing in Step 404 in FIG. 4;

Step 511: the application provider management platform generates an application installation command INSTALL [for install] containing a Load Token according to an issuer Token key and other information, and sends it to the smart card. The smart card feeds back an installation result to the application provider management platform after accomplishing installation; the transmission method of the INSTALL [for install] command and its response is similar to the SELECT command and response processing in Step 404 in FIG. 4;

Step 512: the application provider management platform notifies the card issuer management platform of an application downloading result, including application state, resource occupation situation, edition situation and the like;

Step 513: after accomplishing application installation, the smart card can send a BIP command-CLOSE CHANNEL to close the BIP connection between the smart card and the mobile terminal; if there is a follow-up operation based on the mobile communication network, the BIP connection may not be closed, and other applications can be downloaded continuously; and Step 514: the TCP/IP connection between the mobile terminal and the OTA server is disconnected.

Wherein there is no sequential relationship between Step 512 and Step 513.

Figure 6:
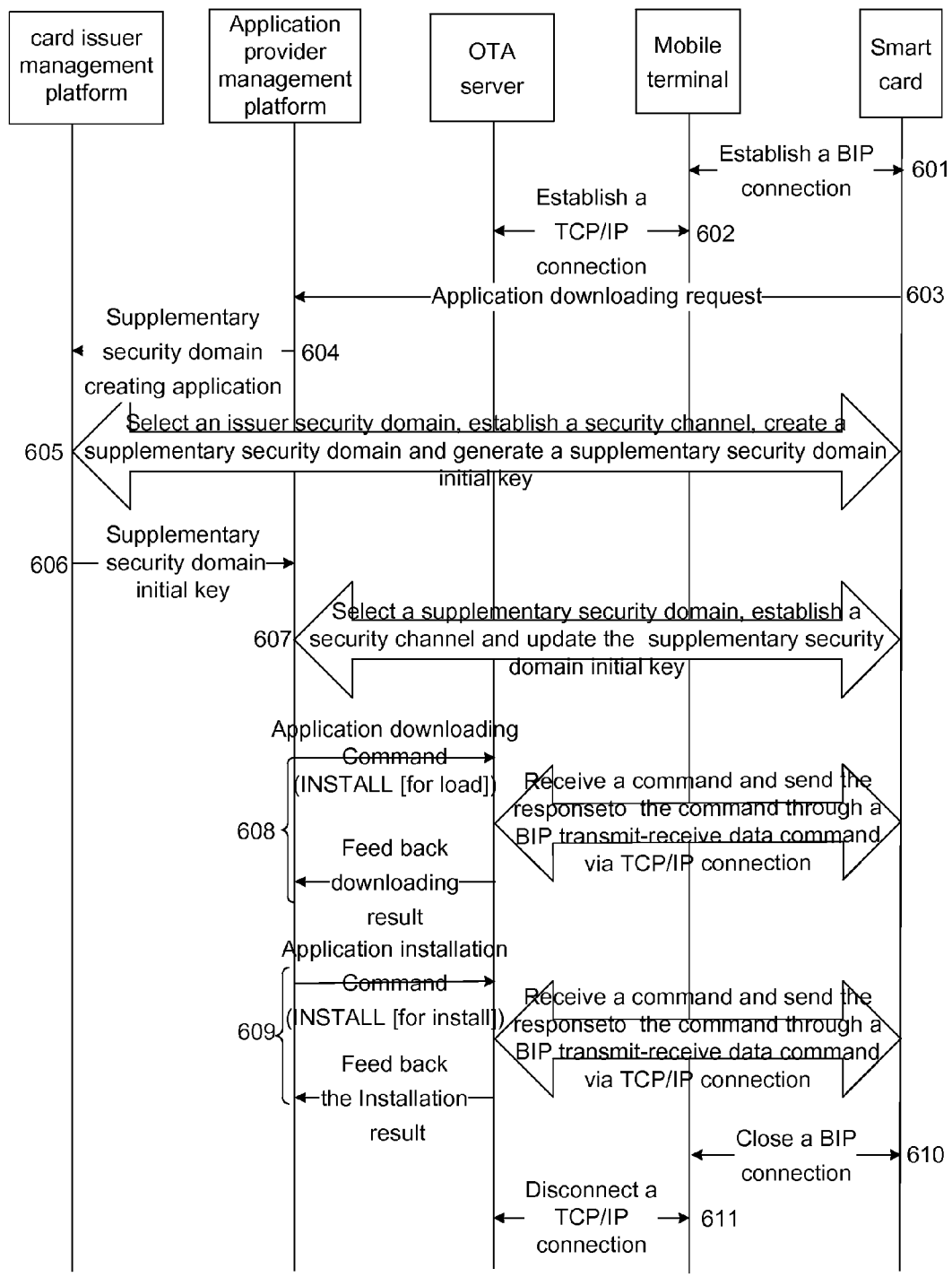
FIG. 6 shows a flow diagram of detailed signaling for downloading and installing an application autonomously controlled by an application provider according to a preferred embodiment of the present invention.

FIG. 6 shows a flow diagram of detailed signaling for downloading and installing an application autonomously controlled by an application provider according to a preferred embodiment of the present invention; as shown in FIG. 6, the flow comprises the following processing:

Step 601: a user selects an application downloading menu item through an STK menu of the smart card, or, the user selects an application for downloading in the manner of web page browse based on the SCWS and initiates a connection between the smart card and the OTA server as well as the application provider management platform; and the smart card establishes a BIP connection through sending a BIP command-OPEN CHANNEL to the mobile terminal; in the OPEN CHANNEL command, the smart card specifies BIP connection parameters including supported transmission protocol types (such as a transmission control protocol (TCP) and the like), size of a data buffer zone, network address of the OTA server, a channel number and the like;

Step 602: the mobile terminal establishes a BIP connection with the smart card, and establishes a TCP/IP connection with the OTA server according to network address of the OTA server and the transmission protocol type in the OPEN CHANNEL command;

Step 603: after the TCP/IP connection is established, the smart card initiates an application downloading request to the application provider management platform;

Step 604: if no supplementary security domain is created for the application, the application provider management platform sends a supplementary security domain creating application to the card issuer management platform; and if a supplementary security domain has been created for the application, Step 607 is executed directly;

Step 605: the card issuer management platform establishes a security channel with the smart card according to the provisions of Global Platform V2.2, then creates a supplementary security domain and generates a supplementary security domain initial key; the transmission method of the command used in the above process is similar to the SELECT command and response processing in Step 404 in FIG. 4;

Step 606: the card issuer management platform sends the supplementary security domain initial key to the application provider management platform;

Step 607: the application provider management platform selects a supplementary security domain of the smart card through the OTA server and the mobile terminal thereof, establishes a security channel with the smart card, and updates the supplementary security domain key; the transmission method of the command used in the above process is similar to the SELECT command and response processing in Step 404 in FIG. 4;

Step 608: the application provider management platform generates an application downloading command INSTALL [for load] and sends it to the smart card, and according to the size of an application file, a plurality of INSTALL [for load] commands may be included; the smart card feeds back a downloading result to the application provider management platform after accomplishing downloading; and the transmission method of the INSTALL [for load] command and its response is similar to the SELECT command and response processing in Step 404 in FIG. 4;

Step 609: the application provider management platform generates an application installation command INSTALL [for install] and sends it to the smart card; the smart card feeds back an installation result to the application provider management platform after accomplishing installation; and the transmission method of the INSTALL [for install] command and its response is similar to the SELECT command and response processing in Step 404 in FIG. 4;

Step 610: after accomplishing the application installation, the smart card may send a BIP command-CLOSE CHANNEL to close the BIP connection between the smart card and the mobile terminal; if there is a follow-up operation based on the mobile communication network, the BIP connection may not be closed, and other applications can be downloaded continuously; and Step 611: the TCP/IP connection between the mobile terminal and the OTA server is disconnected.

In FIG. 4, FIG. 5 and FIG. 6, commands or responses, between the card issuer management platform or the application provider management platform and the smart card, are attached as a data volume to channel data of an active command supported by BIP; if the mobile terminal does not support a mobile data service channel, or the mobile terminal or the smart card does not support the BIP, the commands or responses can also be attached to a short message for transmission, the process thereof is similar to the above, and unnecessary details are not given here.

The above are only preferred embodiments of the present invention and not intended to limit the scope of protection of the present invention, and for those skilled in the art, the present invention can have various modifications and changes. Any modification, equivalent substitute, improvement and the like within the spirit and principle of the invention shall fall within the scope of protection of the invention.

The invention claimed is:

1. A method for downloading an application, comprising:
    establishing a connection with a smart card through an Over The Air (OTA) server and a mobile terminal by an outside-card entity management platform, wherein the outside-card entity management platform is a card issuer management platform or an application provider management platform;
    selecting a security domain responsible for application downloading from the smart card after receiving an application downloading request from the smart card, and establishing a security channel with the smart card by the outside-card entity management platform;
    and downloading the application to the smart card using the security channel by the outside-card entity management platform,
    wherein the selecting the security domain responsible for application downloading from the smart card specifically comprises:
    when the application is an application self-owned by a card issuer, the card issuer management platform establishes the security channel with the smart card and selects an issuer security domain in the smart card, or, creates a supplementary security domain for the application and selects the supplementary security domain;
    when the application is an application autonomously controlled by an application provider or an application entrusted by the application provider to the card issuer for management, if no supplementary security domain is created for the application, the card issuer management platform selects the issuer security domain, establishes the security channel with the smart card based on the issuer security domain, creates the supplementary security domain using the security channel, generates a supplementary security domain initial key, and sends the supplementary security domain initial key to the application provider management platform using the security channel; the application provider management platform selects the supplementary security domain responsible for application downloading and updates a supplementary security domain key using the security channel; and if the supplementary security domain has been created for the application, the application provider management platform selects the supplementary security domain responsible for application downloading and updates the supplementary security domain key using the security channel;

wherein the card issuer management platform or the application provider management platform establishing the connection with the smart card through the OTA server and the mobile terminal specifically comprises:

the card issuer management platform or the application provider management platform establishes the connection with the OTA server according to a preset connection method or a preset protocol;

the OTA server establishes the connection with the smart card in the mobile terminal through a mobile data service channel or a short message channel;

wherein the establishing the connection with the smart card through the OTA server and the mobile terminal specifically comprises: the smart card establishes a Bearer Independent Protocol (BIP) connection with the mobile terminal, and the connection is established between the mobile terminal and the OTA server through the preset protocol;

the mobile terminal transparently transmits data between the smart card and the OTA server, and interactive commands or responses between the card issuer management platform or the application provider management platform and the smart card are attached as a data volume to channel data of an active command supported by the BIP, wherein the card issuer management platform or the application provider management platform encapsulates commands as data according to a preset data format and sends the encapsulated commands to the mobile terminal through the OTA server; and after receiving a Data Available event from the mobile terminal, the smart card uses a Receive Data command to receive the data, parses the data to obtain the commands, and performs corresponding operations according to the commands;

after the operations are accomplished, the smart card encapsulates responses to the commands in the form of channel data of a Send Data command, and sends the encapsulated responses to the mobile terminal and then to the card issuer management platform or the application provider management platform through the OTA server.

2. The method according to claim 1, wherein when the application is the application-entrusted by the application provider to the card issuer for management, the outside-card entity management platform comprises the card issuer management platform and the application provider-management platform; and the method specifically comprises:

the card issuer management platform establishes the connection with the smart card through the OTA server and the mobile terminal and receives the application downloading request sent by the smart card;

the application provider management platform selects the supplementary security domain responsible for application downloading from the smart card, establishes the security channel with the smart card through the card issuer management platform, the OTA server and the mobile terminal, and downloads the application to the smart card using the security channel.

3. The method according to claim 1, before receiving the application downloading request from the smart card, the method further comprising:

selecting the application to download by a user through a subscriber identity module (SIM) Tool Kit (STK) menu of the smart card;

or, selecting the application to download through browsing web pages by the user based on a Smart Card Web Server (SCWS), and initiating the connection between the smart card and the mobile terminal, the OTA server and the outside-card entity management platform; and after the connection is established, initiating the application downloading request by the smart card.

4. The method according to claim 1, wherein the establishing the security channel between the outside-card entity management platform and the smart card specifically comprises:

the outside-card entity management platform performs identity authentication with the smart card according to a preset security channel protocol, and establishes the security channel; and the preset security channel protocol is based on a symmetric key or asymmetric key mechanism.

5. The method according to claim 1, wherein in the application downloading process, the card issuer management platform or the application provider management platform sends a preset command to the smart card through the following manners:

the card issuer management platform or the application provider management platform encapsulates the preset command as data and sends the encapsulated preset command to the smart card in the mobile terminal through the OTA server; the smart card uses a Bearer Independent Protocol (BIP) command to receive the encapsulated preset command, parses the received preset command and executes a corresponding operation according to the preset command;

or, the card issuer management platform or the application provider management platform sends the preset command to the smart card through a downlink short message of the OTA server, and the smart card receives the preset command from the downlink short message and executes a corresponding operation according to the preset command.

6. The method according to claim 5, after the corresponding operation is executed according to the preset command, the method further comprising: sending a response to the preset command by the smart card to the card issuer management platform or the application provider management platform in the following manners:

after executing the corresponding operation, the smart card encapsulates a command in response to the preset command according to a data format of the BIP command and sends the encapsulated response command to the mobile terminal; and the mobile terminal sends the response to the preset command to the card issuer management platform or the application provider management platform through the OTA server;

or, after executing the corresponding operation, the smart card sends the response to the preset command to the mobile terminal in the form of an uplink short message, and the mobile terminal sends the response to the preset command to the card issuer management platform or the application provider management platform through the OTA server.

7. The method according to claim 5, wherein when the preset command is the application downloading command, the smart card executes application downloading after receiving the preset command.

8. The method according to claim 5, when the application is the application-entrusted by the application provider to the card issuer for management, the method further comprising:
sending a token application to the card issuer management platform and receiving a token key from the card issuer management platform by the application provider management platform;
the application provider management platform sending the preset command to the smart card specifically comprises: the application provider management platform generates the preset command containing a load token and sends the preset command to the smart card in the mobile terminal through the OTA server.

9. The method according to claim 2, before receiving the application downloading request from the smart card, the method further comprising:
selecting the application to download by a user through a SIM Tool Kit (STK) menu of the smart card;
or, selecting the application to download through browsing web pages by the user based on a Smart Card Web Server (SCWS), and initiating a the connection between the smart card and the mobile terminal, the OTA server and the outside-card entity management platform; and after the connection is established, initiating the application downloading request by the smart card.

10. The method according to claim 2, wherein the establishing the security channel between the outside-card entity management platform and the smart card specifically comprises: the outside-card entity management platform performs identity authentication with the smart card according to a preset security channel protocol, and establishes the security channel; and
the preset security channel protocol is based on a symmetric key or asymmetric key mechanism.

11. A system for downloading an application, comprising a smart card, a mobile terminal, an Over The Air (OTA) server and an outside-card entity management platform, wherein
the outside-card entity management platform comprises a card issuer management platform or an application provider management platform that establishes a connection with the smart card through the OTA server and the mobile terminal, receives an application downloading request from the smart card, selects a security domain responsible for application downloading from the smart card, and downloads the application to the smart card using a security channel after the security channel is established with the smart card;
the OTA server establishes a security connection with the outside-card entity management platform, connects with the mobile terminal, and provides downloading service for the smart card in the mobile terminal; and
the smart card, which is located in the mobile terminal, establishes the security channel with the outside-card entity management platform through the mobile terminal and the OTA server and performs an application downloading operation over the security channel,
wherein the selecting the security domain responsible for application downloading from the smart card specifically comprises:
when the application is an application self-owned by a card issuer, the card issuer management platform establishes the security channel with the smart card and selects an issuer security domain in the smart card, or, creates a supplementary security domain for the application and selects the supplementary security domain;
when the application is an application autonomously controlled by an application provider or an application entrusted by the application provider to the card issuer for management, if no supplementary security domain is created for the application, the card issuer management platform selects the issuer security domain, establishes the security channel with the smart card based on the issuer security domain, creates the supplementary security domain using the security channel, generates a supplementary security domain initial key, and sends the supplementary security domain initial key to the application provider management platform using the security channel; the application provider management platform selects the supplementary security domain responsible for application downloading and updates a supplementary security domain key using the security channel; and if the supplementary security domain has been created for the application, the application provider management platform selects the supplementary security domain responsible for application downloading and updates the supplementary security domain key using the security channel;
wherein the card issuer management platform or the application provider management platform establishing the connection with the smart card through the OTA server and the mobile terminal specifically comprises:
the card issuer management platform or the application provider management platform establishes the connection with the OTA server according to a preset connection method or a preset protocol;
the OTA server establishes the connection with the smart card in the mobile terminal through a mobile data service channel or a short message channel;
wherein the establishing the connection with the smart card through the OTA server and the mobile terminal specifically comprises: the smart card establishes a Bearer Independent Protocol (BIP) connection with the mobile terminal, and the connection is established between the mobile terminal and the OTA server through the preset protocol;
the mobile terminal transparently transmits data between the smart card and the OTA server, and interactive commands or responses between the card issuer management platform or the application provider management platform and the smart card are attached as a data volume to channel data of an active command supported by the BIP,
wherein the card issuer management platform or the application provider management platform encapsulates commands as data according to a preset data format and sends the encapsulated commands to the mobile terminal through the OTA server; and after receiving a Data Available event from the mobile terminal, the smart card uses a Receive Data command to receive the data, parses the data to obtain the commands, and performs corresponding operations according to the commands;
after the operations are accomplished, the smart card encapsulates responses to the commands in the form of channel data of a Send Data command, and sends the encapsulated responses to the mobile terminal and then to the card issuer management platform or the application provider management platform through the OTA server.

12. The system according to claim 11, wherein the outside-card entity management platform is the application provider management platform, and the system further comprises the card issuer management platform, wherein the application provider management platform comprises:
an applying module for sending a supplementary security domain creating request to the card issuer management platform if no supplementary security domain is created for the application;
a receiving module for receiving the supplementary security domain initial key from the card issuer management platform; and
an updating module for updating the supplementary security domain key over the security channel;
the card issuer management platform comprises a creating and sending module for receiving the supplementary security domain creating request from the application provider management platform, creating the supplementary security domain, and generating and sending the supplementary security domain initial key to the application provider management platform.

13. The system according to claim 11, wherein the outside-card entity management platform comprises the card issuer management platform and the application provider management platform, wherein the card issuer management platform establishes the connection with the smart card through the OTA server and the mobile terminal and receives the application downloading request from the smart card; and
the application provider management platform selects the security domain responsible for application downloading from the smart card and downloads the application to the smart card using the security channel after the security channel is established with the smart card.

14. The system according to claim 13, wherein
the card issuer management platform comprises a creating and sending module for creating the supplementary security domain if no supplementary security domain is created for the application, generating the supplementary security domain initial key, and sending the supplementary security domain initial key to the application provider management platform;
the application provider management platform comprises:
a receiving module for receiving the supplementary security domain initial key; and
an updating module for updating the supplementary security domain key over the security channel.

15. The system according to claim 11, wherein
the smart card further comprises a subscriber identity module (SIM) Tool Kit (STK) menu module for providing an application downloading menu for users for selecting the application for downloading;
or, the system further comprises a smart card network server for providing an application downloading option web page for users for selecting the application for downloading.

16. The system according to claim 11, wherein the application provider management platform or the card issuer management platform further comprises an authenticating and establishing module for performing identity authentication with the smart card according to a preset security channel protocol, and establishing the security channel, wherein the preset security channel protocol is based on a symmetric key or asymmetric key mechanism.

17. The system according to claim 11, wherein the card issuer management platform or the application provider management platform further comprises:

an encapsulation module for generating a preset command, and attaching the preset command as a data volume to mobile service data channel data, or attaching the preset command to a downlink short message of the OTA server; and
a sending module for sending the encapsulated preset command to the smart card through the OTA server and the mobile terminal;
the smart card further comprises:
a receiving and parsing module for receiving the encapsulated preset command by using a BIP command, parsing the encapsulated preset command to obtain the preset command, or receiving the preset command from the downlink short message;
an executing module for executing a corresponding operation according to the preset command; and
a responding module for encapsulating a command in response to the preset command according to a data format of the BIP command after the executing module executes the corresponding operation according to the preset command, and sending the encapsulated response to the mobile terminal; or sending, in the form of an uplink short message, the response to the preset command to the mobile terminal which then sends the response to the preset command to the card issuer management platform or the application provider management platform through the OTA server.

18. The system according to claim 17, wherein
the application provider management platform further comprises a token applying module for sending a token application to the card issuer management platform and receiving a token key from the card issuer management platform;
the card issuer management platform further comprises a token sending module for sending a token key to the application provider management platform after receiving the token application from the application provider management platform; and
the encapsulation module is for generating a preset command containing a load token.

19. The system according to claim 11, wherein the smart card and the mobile terminal are specifically for establishing the BIP connection; the mobile terminal and the OTA server are specifically for establishing the connection through the preset protocol; and the mobile terminal is for transparently transmitting data between the smart card and the OTA server.

20. The system according to claim 19, wherein the card issuer management platform or the application provider management platform further comprises:

an encapsulation module for encapsulating a command as data according to the preset data format and attaching a preset command as a data volume to mobile service data channel data; and
a sending module for sending an encapsulated preset command to the mobile terminal through the OTA server;
the smart card further comprises:
a receiving and parsing module for using the Receive Data command to receive data after receiving the Data Available event from the mobile terminal, and parsing the data to obtain the preset command;
an executing module for executing a corresponding operation according to the preset command; and
a responding module for encapsulating a response to the preset command in the form of channel data of the Send Data command after the operation is accomplished and sending the encapsulated response to the mobile terminal and then to the card issuer management platform or the application provider management platform through the OTA server.

21. The system according to claim 12, wherein
the smart card further comprises an STK menu module for providing an application downloading menu for users for selecting the application for downloading;
or, the system further comprises a smart card network server for providing an application downloading option web page for users for selecting the application for downloading.

22. The system according to claim 13, wherein
the smart card further comprises an STK menu module for providing an application downloading menu for users for selecting the application for downloading;
or, the system further comprises a smart card network server for providing an application downloading option web page for users for selecting the application for downloading.

23. The system according to claim 12, wherein the application provider management platform or the card issuer management platform further comprises an authenticating and establishing module for performing identity authentication with the smart card according to a preset security channel protocol, and establishing the security channel, wherein the preset security channel protocol is based on a symmetric key or asymmetric key mechanism.

24. The system according to claim 13, wherein the application provider management platform or the card issuer management platform further comprises an authenticating and establishing module for performing identity authentication with the smart card according to a preset security channel protocol, and establishing the security channel, wherein the preset security channel protocol is based on a symmetric key or asymmetric key mechanism.

25. The system according to claim 14, wherein the application provider management platform or the card issuer management platform further comprises an authenticating and establishing module for performing identity authentication with the smart card according to a preset security channel protocol, and establishing the security channel, wherein the preset security channel protocol is based on a symmetric key or asymmetric key mechanism.

26. The system according to claim 12, wherein
the card issuer management platform or the application provider management platform further comprises:
an encapsulation module for generating a preset command, and attaching the preset command as a data volume to mobile service data channel data, or attaching the preset command to a downlink short message of the OTA server; and
a sending module for sending the encapsulated preset command to the smart card through the OTA server and the mobile terminal;
the smart card further comprises:
a receiving and parsing module for receiving the encapsulated preset command by using a BIP command, parsing the encapsulated preset command to obtain the preset command, or receiving the preset command from the downlink short message;
an executing module for executing a corresponding operation according to the preset command; and
a responding module for encapsulating a command in response to the preset command according to a data format of the BIP command after the executing module executes the corresponding operation according to the preset command, and sending the encapsulated response to the mobile terminal; or sending, in the form of an uplink short message, the response to the preset command to the mobile terminal which then sends the response to the preset command to the card issuer management platform or the application provider management platform through the OTA server.

27. The system according to claim 13, wherein
the card issuer management platform or the application provider management platform further comprises:
an encapsulation module for generating a preset command, and attaching the preset command as a data volume to mobile service data channel data, or attaching the preset command to a downlink short message of the OTA server; and
a sending module for sending the encapsulated preset command to the smart card through the OTA server and the mobile terminal;
the smart card further comprises:
a receiving and parsing module for receiving the encapsulated preset command by using a BIP command, parsing the encapsulated preset command to obtain the preset command, or receiving the preset command from the downlink short message;
an executing module for executing a corresponding operation according to the preset command; and
a responding module for encapsulating a command in response to the preset command according to a data format of the BIP command after the executing module executes the corresponding operation according to the preset command, and sending the encapsulated response to the mobile terminal; or sending, in the form of an uplink short message, the response to the preset command to the mobile terminal which then sends the response to the preset command to the card issuer management platform or the application provider management platform through the OTA server.

28. The system according to claim 14, wherein
the card issuer management platform or the application provider management platform further comprises:
an encapsulation module for generating a preset command, and attaching the preset command as a data volume to mobile service data channel data, or attaching the preset command to a downlink short message of the OTA server; and
a sending module for sending the encapsulated preset command to the smart card through the OTA server and the mobile terminal;
the smart card further comprises:
a receiving and parsing module for receiving the encapsulated preset command by using a BIP command, parsing the encapsulated preset command to obtain the preset command, or receiving the preset command from the downlink short message;
an executing module for executing a corresponding operation according to the preset command; and
a responding module for encapsulating a command in response to the preset command according to a data format of the BIP command after the executing module executes the corresponding operation according to the preset command, and sending the encapsulated response to the mobile terminal; or sending, in the form of an uplink short message, the response to the preset command to the mobile terminal which then sends the response to the preset command to the card issuer management platform or the application provider management platform through the OTA server.

29. The system according to claim 26, wherein
the application provider management platform further comprises a token applying module for sending a token application to the card issuer management platform and receiving a token key from the card issuer management platform;

the card issuer management platform further comprises a token sending module for sending a token key to the application provider management platform after receiving the token application from the application provider management platform; and the encapsulation module is for generating a preset command containing a load token.

30. The system according to claim 27, wherein the application provider management platform further comprises a token applying module for sending a token application to the card issuer management platform and receiving a token key from the card issuer management platform;

the card issuer management platform further comprises a token sending module for sending a token key to the application provider management platform after receiving the token application from the application provider management platform; and the encapsulation module is for generating a preset command containing a load token.

31. The system according to claim 28, wherein the application provider management platform further comprises a token applying module for sending a token application to the card issuer management platform and receiving a token key from the card issuer management platform;

the card issuer management platform further comprises a token sending module for sending a token key to the application provider management platform after receiving the token application from the application provider management platform; and the encapsulation module is for generating a preset command containing a load token.

32. The system according to claim 12, wherein the smart card and the mobile terminal are specifically for establishing the BIP connection; the mobile terminal and the OTA server are specifically for establishing the connection through the preset protocol; and the mobile terminal is for transparently transmitting data between the smart card and the OTA server.

33. The system according to claim 13, wherein the smart card and the mobile terminal are specifically for establishing the BIP connection; the mobile terminal and the OTA server are specifically for establishing the connection through the preset protocol; and the mobile terminal is for transparently transmitting data between the smart card and the OTA server.

34. The system according to claim 14, wherein the smart card and the mobile terminal are specifically for establishing the BIP connection; the mobile terminal and the OTA server are specifically for establishing the connection through the preset protocol; and the mobile terminal is for transparently transmitting data between the smart card and the OTA server.

35. The system according to claim 32, wherein the card issuer management platform or the application provider management platform further comprises:

an encapsulation module for encapsulating a command as data according to the preset data format and attaching a preset command as a data volume to mobile service data channel data; and a sending module for sending an encapsulated preset command to the mobile terminal through the OTA server;

the smart card further comprises:

a receiving and parsing module for using the Receive Data command to receive data after receiving the Data Available event from the mobile terminal, and parsing the data to obtain the preset command;

an executing module for executing a corresponding operation according to the preset command; and a responding module for encapsulating a response to the preset command in the form of channel data of the Send Data command after the operation is accomplished and sending the encapsulated response to the mobile terminal and then to the card issuer management platform or the application provider management platform through the OTA server.

36. The system according to claim 33, wherein the card issuer management platform or the application provider management platform further comprises:

an encapsulation module for encapsulating a command as data according to the preset data format and attaching a preset command as a data volume to mobile service data channel data; and a sending module for sending an encapsulated preset command to the mobile terminal through the OTA server;

the smart card further comprises:

a receiving and parsing module for using the Receive Data command to receive data after receiving the Data Available event from the mobile terminal, and parsing the data to obtain the preset command;

an executing module for executing a corresponding operation according to the preset command; and a responding module for encapsulating a response to the preset command in the form of channel data of the Send Data command after the operation is accomplished and sending the encapsulated response to the mobile terminal and then to the card issuer management platform or the application provider management platform through the OTA server.

37. The system according to claim 34, wherein the card issuer management platform or the application provider management platform further comprises:

an encapsulation module for encapsulating a command as data according to the preset data format and attaching a preset command as a data volume to mobile service data channel data; and a sending module for sending an encapsulated preset command to the mobile terminal through the OTA server;

the smart card further comprises:

a receiving and parsing module for using the Receive Data command to receive data after receiving the Data Available event from the mobile terminal, and parsing the data to obtain the preset command;

an executing module for executing a corresponding operation according to the preset command; and a responding module for encapsulating a response to the preset command in the form of channel data of the Send Data command after the operation is accomplished and sending the encapsulated response to the mobile terminal and then to the card issuer management platform or the application provider management platform through the OTA server.

* * * * *